United States Patent
Gaillard et al.

(10) Patent No.: US 10,974,418 B2
(45) Date of Patent: *Apr. 13, 2021

(54) METHOD OF PRODUCING A FIBROUS MATERIAL PRE-IMPREGNATED WITH THERMOPLASTIC POLYMER IN A FLUID BED

(71) Applicant: ARKEMA FRANCE, Colombes (FR)

(72) Inventors: Patrice Gaillard, Hagetaubin (FR); Gilles Hochstetter, L'Hay-les-Roses (FR); Thibaut Savart, Lacanau de Mios (FR)

(73) Assignee: ARKEMA FRANCE, Colombes (FR)

( * ) Notice: Subject to any disclaimer, the term of this patent is extended or adjusted under 35 U.S.C. 154(b) by 582 days.

This patent is subject to a terminal disclaimer.

(21) Appl. No.: 15/118,188

(22) PCT Filed: Feb. 11, 2015

(86) PCT No.: PCT/FR2015/050331
§ 371 (c)(1),
(2) Date: Aug. 11, 2016

(87) PCT Pub. No.: WO2015/121583
PCT Pub. Date: Aug. 20, 2015

(65) Prior Publication Data
US 2017/0165875 A1    Jun. 15, 2017

(30) Foreign Application Priority Data

Feb. 13, 2014 (FR) .................................... 1451137

(51) Int. Cl.
*B29B 15/12* (2006.01)
*B29C 70/38* (2006.01)
(Continued)

(52) U.S. Cl.
CPC ............ *B29B 15/12* (2013.01); *B29B 15/122* (2013.01); *B29C 70/382* (2013.01);
(Continued)

(58) Field of Classification Search
CPC ..... B29B 15/12; B29B 15/122; B29C 70/382; B29C 70/506; B29K 2105/10; B29K 2101/12
See application file for complete search history.

(56) References Cited

U.S. PATENT DOCUMENTS

| | | |
|---|---|---|
| 4,541,884 A | 9/1985 | Cogswell et al. |
| 4,614,678 A | 9/1986 | Ganga |

(Continued)

FOREIGN PATENT DOCUMENTS

| | | |
|---|---|---|
| EP | 0 201 367 A1 | 11/1986 |
| EP | 0 324 680 A2 | 7/1989 |

(Continued)

OTHER PUBLICATIONS

International Preliminary Report on Patentability (Form PCT/IB/373) and the Written Opinion of the International Searching Authority (Form PCT/ISA/237) dated Aug. 31, 2016, by the International Bureau of WIPO, in corresponding International Application No. PCT/FR2015/050331 (24 pages).

(Continued)

*Primary Examiner* — Robert J Grun

(74) *Attorney, Agent, or Firm* — Buchanan Ingersoll & Rooney P.C.

(57) ABSTRACT

A method of producing a pre-impregnated fibrous material including a fibrous material of continuous fibres and a thermoplastic polymer matrix, wherein the pre-impregnated fibrous material is produced in a single unidirectional strip or in a plurality of parallel unidirectional strips, the method including the following steps: (i) impregnating the fibrous (Continued)

Figure 1:
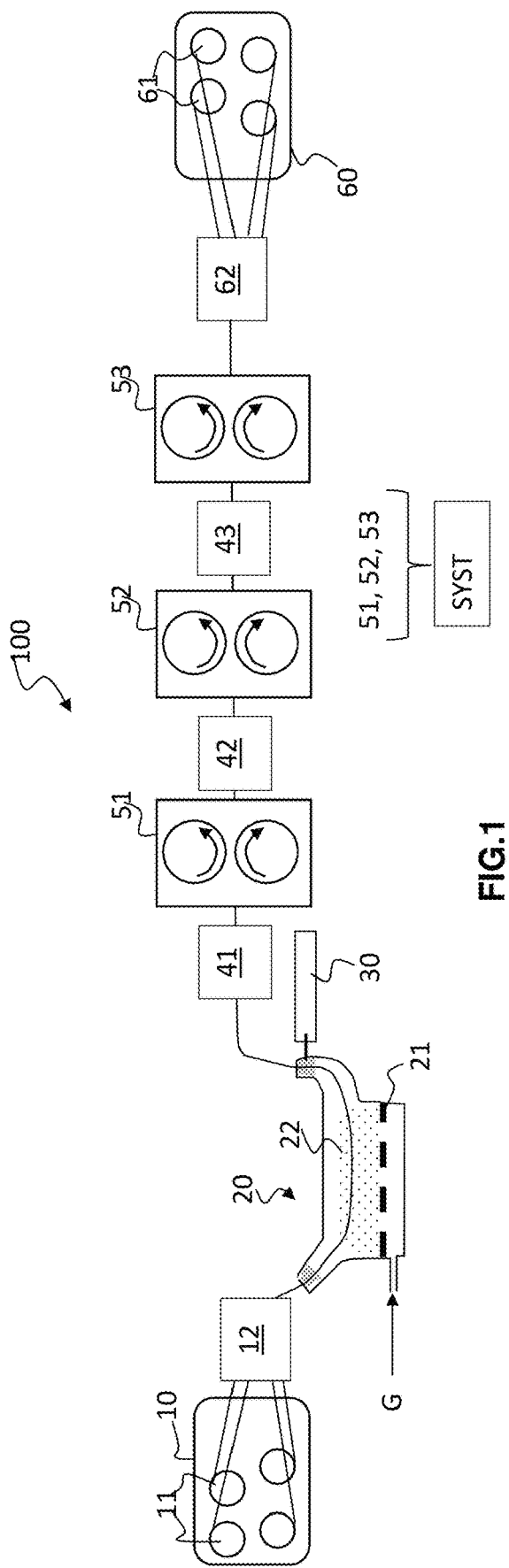

material in the form of a strand or a plurality of parallel strands with the thermoplastic polymer in the form of a powder in a fluid bed; and (ii) shaping the strand or parallel strands of the fibrous material impregnated as in step (i) by calendering by at least one heating calender in the form of a single unidirectional strip or of a plurality of parallel unidirectional strips, the heating calender, in the latter case, including a plurality of calendering grooves, and the pressure and/or a spacing between the rollers of the calender being regulated by an auxiliary system.

25 Claims, 2 Drawing Sheets

(51) Int. Cl.
*B29C 70/50* (2006.01)
*B29K 101/12* (2006.01)
*B29K 105/10* (2006.01)

(52) U.S. Cl.
CPC ........ *B29C 70/506* (2013.01); *B29K 2101/12* (2013.01); *B29K 2105/10* (2013.01)

(56) References Cited

U.S. PATENT DOCUMENTS

| | | | |
|---|---|---|---|
| 5,137,766 A | 8/1992 | Mazanek et al. | |
| 5,171,630 A | 12/1992 | Muzzy et al. | |
| 5,869,172 A * | 2/1999 | Caldwell | A61F 13/00063 128/849 |
| 7,211,291 B2 * | 5/2007 | Harpell | B29C 70/504 427/180 |
| 2007/0175570 A1 * | 8/2007 | Jentgens | B29C 70/50 156/181 |
| 2010/0101675 A1 | 4/2010 | Do et al. | |
| 2012/0077398 A1 | 3/2012 | Gaillard et al. | |
| 2013/0106014 A1 | 5/2013 | Ishibashi et al. | |
| 2013/0248087 A1 * | 9/2013 | Gaillard | B29C 70/025 156/180 |
| 2014/0316063 A1 * | 10/2014 | Hochstetter | B29C 70/52 524/607 |
| 2015/0322622 A1 | 11/2015 | Gaillard et al. | |

FOREIGN PATENT DOCUMENTS

| | | |
|---|---|---|
| EP | 0 335 186 A2 | 10/1989 |
| EP | 0 406 067 A1 | 1/1991 |
| EP | 0 554 950 A1 | 8/1993 |
| EP | 1 486 319 A1 | 12/2004 |
| EP | 2 559 540 A1 | 2/2013 |
| EP | 2 586 585 A1 | 5/2013 |
| FR | 2 967 371 A1 | 5/2012 |
| JP | H02-173125 A | 7/1990 |
| KR | 10-2012-0011038 A | 2/2012 |
| WO | WO 92/20521 A1 | 11/1992 |
| WO | WO 2008/135663 A2 | 11/2008 |
| WO | WO 2012/066241 A2 | 5/2012 |

OTHER PUBLICATIONS

International Search Report (PCT/ISA/210) dated Aug. 6, 2015, by the French Patent Office as the International Searching Authority for International Application No. PCT/FR2015/050331.

* cited by examiner

METHOD OF PRODUCING A FIBROUS MATERIAL PRE-IMPREGNATED WITH THERMOPLASTIC POLYMER IN A FLUID BED

FIELD OF THE INVENTION

The present invention concerns a method of producing a fibrous material pre-impregnated with thermoplastic polymer.

More particularly, the invention relates to a method for producing a pre impregnated fibrous material comprising an impregnation step followed by a forming step to obtain ribbons of pre-impregnated fibrous material, of calibrated size, able to be directly used for the manufacture of three-dimensional composite parts.

In the present description, by "fibrous material" is meant an assembly of reinforcing fibres. Before forming, it is in the form of roving. After forming, it is in the form of strips or sheets or piece-form. If the reinforcing fibres are continuous, the assembly thereof forms a fabric. If the fibres are short, the assembly thereof forms a felt or nonwoven.

Those fibres able to be included in the composition of fibrous materials are more especially carbon fibres, glass fibres, basalt fibres, silicon carbide fibres, polymer-based fibres, plant fibres or cellulose fibres used alone or in a mixture.

Such pre-impregnated fibrous materials are intended in particular for the production of light composite materials to manufacture mechanical parts having a three-dimensional structure, good mechanical strength and thermal properties, capable of evacuating electrostatic charges i.e. properties compatible with the manufacture of parts particularly in the following sectors: mechanical, aeronautical, nautical, automobile, energy, health and medical, military and armament, sports and leisure equipment and electronics.

Such pre-impregnated fibrous materials are also called composite materials. They comprise the fibrous material formed of reinforcing fibres and a matrix formed of the impregnating polymer. The primary role of this matrix is to maintain the reinforcing fibres in compact form and to impart the desired shape to the end product. Said matrix acts inter alia to protect the reinforcing fibres against abrasion and harsh environments, to control surface appearance and to disperse any charges between the fibres. This matrix plays a major role in the long-term resistance of the composite material, in particular regarding fatigue and creep.

PRIOR ART

The good quality of the three-dimensional composite parts produced from pre-impregnated fibrous material therefore demands control first over the impregnating process of the reinforcing fibre with thermoplastic polymer and secondly over the forming of the pre-impregnated fibrous material into a semi-finished product.

In the present description, the term "strip" is used to designate strips of fibrous material having a width of 100 mm or wider. The term "ribbon" is used to designate ribbons of calibrated width of 100 mm or less.

Up until the present time the production of strips of fibrous materials, reinforced by impregnating with thermoplastic polymer or thermosetting polymer, has been carried out using several processes depending in particular on the type of polymer, the type of desired end composite material and field of application. Powder deposit or molten polymer extrusion technologies are used to impregnate reinforcing fibres with thermosetting polymers e.g. epoxy resins such as described in patent WO2012/066241A2. In general, these technologies cannot be applied directly to impregnation with thermoplastic polymers, in particular those with high melting temperature the viscosity of which in the molten state is too high to obtain satisfactory impregnation of the fibres and good quality semi-finished or finished products.

Another known impregnation process is the continuous passing of fibres through an aqueous dispersion of polymer powder or aqueous dispersion of polymer particles, or aqueous polymer emulsion or suspension. It is possible for example to refer to document EP0324680. In this process a dispersion of powders of micrometric size (about 20 µm) is used. After being immersed in the aqueous solution, the fibres are impregnated with the polymer powder. The process therefore entails a drying step to place the impregnated fibres in a first oven to evaporate the water absorbed during immersion. A heat treatment step to pass the dried impregnated fibres through a second heating zone at high temperature is then needed to melt the polymer so that it adheres, is distributed and coats the fibres.

The major drawback of this method is the homogeneity of the deposit which is often imperfect. Another problem related to this process is the high porosity induced by poor distribution of the polymer within the fibres, which may persist after the heat treatment step, resulting in the onset of a large number of defects in the pre-impregnated fibrous material. The pre-impregnated fibrous material then needs to be formed into ribbons for example. The forming technique may also further deteriorate and weaken the material through the presence of these defects.

Some companies market strips of fibrous materials obtained using a method to impregnate unidirectional fibres via continuous drawing of the fibres through a bath of molten thermoplastic polymer containing an organic solvent such as benzophenone. Reference can be made for example to document U.S. Pat. No. 4,541,884 by Imperial Chemical Industries. The presence of the organic solvent particularly allows adapting of the viscosity of the molten mixture and ensures good coating of the fibres. The fibres thus impregnated are then formed. For example they can be cut up into strips of different widths, placed under a press and heated to a temperature above the melting temperature of the polymer to ensure cohesion of the material and in particular adhesion of the polymer to the fibres. This impregnation and forming method allows structural parts to be obtained having high mechanical strength.

One of the disadvantages of this technique lies in the heating temperature required to obtain these materials. The melting temperature of the polymers is notably dependent upon their chemical nature. It may be relatively high for polymers of polymethyl methacrylate type (PMMA), even very high for polymers of polyphenylene sulfide (PPS), polyether ether ketone (PEEK) or polyether ketone ketone (PEKK) type for example. The heating temperature may therefore reach a temperature higher than 250° C., and even higher than 350° C., these temperatures being far higher than the boiling point and flash point of the solvent which are 305° C. and 150° C. respectively for benzophenone. In this case, sudden departure of the solvent is observed leading to high porosity within the fibre and thereby causing the onset of defects in the composite material. The process is therefore difficult to reproduce and involves risks of explosion placing operators in danger. Finally the use of organic solvents is to be avoided for environmental, hygiene and operator safety reasons.

Document EP 0 406 067, filed jointly by Atochem and the French State, and document EP 0 201 367 describe an impregnation technique using a fluidised bed of polymer powder. The fibres enter a closed fluidisation tank where they come to be separated from one another by rollers or splined cylinders, the fibres being electrostatically charged via friction in contact with these rollers or cylinders. This electrostatic charge enables the polymer powder to adhere to the surface of the fibres and thereby impregnate the latter.

Document WO2008/135663, in a third variant, describes the production of a ribbon of impregnated fibres. In this document, the ribbon of fibres is already pre formed prior to the impregnation step, in the form of a ribbon composed of fibres held together by retaining means. The preformed ribbon is first charged with static electricity and then immersed in a chamber containing a fluidised bed of fine polymer particles in suspension in compressed air, so as to coat the ribbon with a layer of polymer coating. Said document does not allow the impregnation of one or more fibre rovings simultaneously, nor continuous forming of the pre-impregnated rovings into ribbon form.

Document EP2586585 also describes the principle of impregnating fibres by passing them through a fluidised bed of polymer particles. On the other hand, it does not describe the continuous forming of one or more rovings thus impregnated into the form of one or more parallel unidirectional ribbons.

Document EP0335186 describes the possible use of a calender or press to compact a composite comprising pre-impregnated metal fibres, used to manufacture a moulded body for shielding against electromagnetic radiation. It does not describe the impregnating of one or more fibre rovings and the continuous forming thereof into one or more parallel unidirectional ribbons by hot calendering.

With regard to the forming of pre-impregnated fibrous materials into calibrated ribbons adapted for the manufacture of three-dimensional composite parts by automated fibre placement, this is generally performed post-treatment.

For example, document WO92/20521 describes the possibility of impregnating a fibre roving by passing it through a fluidised bed of thermoplastic powder particles. The fibres thus coated with polymer particles are heated in an oven or heating device so that the polymer fully enters into and coats the fibres. Post treatment of the pre-impregnated fibrous reinforcement obtained may entail passing it through a polishing roller assembly allowing improved impregnation with the matrix still in the liquid state. One or more overlaid fibrous reinforcements can also be placed between two rollers to form a strip. Said document does not allow the impregnating of one or more fibre rovings and continuous forming of the pre-impregnated rovings into one or more parallel unidirectional ribbons.

The quality of ribbons in pre-impregnated fibrous material and hence the quality of the end composite material depends not only on the homogeneity of fibre impregnation and hence on the control over and reproducibility of the porosity of the pre-impregnated fibrous material, but also on the size and more particularly the width and thickness of the final ribbons. Regularity and control over these two dimensional parameters would allow an improvement in the mechanical strength of the materials.

At the current time, irrespective of the process used to impregnate fibrous materials, the manufacture of ribbons of narrow width i.e. having a width of less than 100 mm generally requires slitting (i.e. cutting) of strips more than 500 mm wide also known as sheets. The ribbons thus cut to size are then taken up for depositing by a robotic head.

In addition, since the rolls of sheet do not exceed a length in the order of 1 km, the ribbons obtained after cutting are generally not sufficiently long to obtain some materials of large size produced by automated fibre deposition. The ribbons must therefore be stubbed to obtain a longer length, thereby creating over thicknesses. These over-thicknesses lead to the onset of heterogeneities which are detrimental to obtaining composite materials of good quality.

Current techniques to impregnate fibrous materials and to form such pre-impregnated fibrous materials into calibrated ribbons therefore have several disadvantages. It is difficult for example to heat a molten mixture of thermoplastic polymers homogeneously inside a die, when it leaves the die and far as the core of the material, which deteriorates the quality of impregnation. In addition, the difference in temperature existing between the fibres and a molten mixture of polymers at the impregnating die also deteriorates the quality and homogeneity of impregnation. The use of organic solvents generally implies the onset of defects in the material and environmental risks of health and safety in general. The forming at post-treatment and at high temperature of the pre-impregnated fibrous material into strips remains difficult since it does not always allow homogenous distribution of the polymer within the fibres which leads to obtaining material of lesser quality, with ill-controlled porosity. The slitting of sheet to obtain calibrated ribbons and stubbing of these ribbons give rise to additional production costs. Slitting also generates major dust problems which pollute the ribbons of pre-impregnated fibrous materials used for automated deposit and can lead to robot ill-functioning and/or imperfections in the composites. This potentially leads to robot repair costs, stoppage of production and discarding of nonconforming products. Finally, at the slitting step a non-eligible amount of fibres is deteriorated leading to loss of properties and in particular to a reduction in mechanical strength and conductivity of the ribbons in pre-impregnated fibrous material.

Technical Problem

It is therefore the objective of the invention to overcome at least one of the disadvantages of the prior art. In particular, the invention sets out to propose a method of producing a pre-impregnated fibrous material, associating an impregnation technique with a continuous forming technique, to avoid any post-treatment step of the fibrous material and to obtain a pre-impregnated fibrous material having homogeneous impregnation of the fibre and controlled dimensions, with controlled reproducible porosity, on which depends the performance of the end composite part.

BRIEF DESCRIPTION OF THE INVENTION

For this purpose the subject of the invention is a method of producing a pre impregnated fibrous material comprising a fibrous material of continuous fibres and a thermoplastic polymer matrix, characterized in that said pre-impregnated fibrous material is produced in a single unidirectional ribbon or a plurality of parallel unidirectional ribbons and in that the method comprises the following steps:
  i. impregnating said fibrous material, in the form of a roving or several parallel rovings, with said thermoplastic polymer in the form of a fluidised bed powder;
  ii. forming said roving or said parallel rovings of said fibrous material impregnated at step i), via calendering by means of at least one heating calender, into the form of a single unidirectional ribbon or a plurality of parallel unidirectional ribbons and in the latter case said heating calender comprises a plurality of calendering grooves, preferably up to 200 calendering grooves conforming to the number of said ribbons, the pressure and/or spacing between the rollers of said calender being regulated by a servo system.

Therefore the hot calendering of the pre-impregnated roving or rovings, just downstream of the continuous impregnation device in a fluidised bed, allows homogenised distribution of the polymer and impregnation of the fibres, provides control over and reduces porosities within the pre-impregnated fibrous material and allows the obtaining of one or more ribbons of long length, wide width and calibrated thickness. With the method of the invention it is therefore possible to avoid the use of molten polymer having viscosity that is too high and the detrimental use of organic solvents, and it also allows the forming of ribbons of calibrated dimensions without having recourse to a slitting or stubbing step.

According to other optional characteristics of the method:
- it further comprises a step iii) of spooling said ribbon(s) on one or more spools, the number of spools being identical to the number of ribbons, one spool being allocated to each ribbon;
- said impregnation step i) is completed by a coating step of said single roving or said plurality of parallel rovings after impregnation with the powder at step i), with a molten thermoplastic polymer which may be the same or different from said polymer in fluidised bed powder form, said coating step being performed before said calendering step ii), said molten polymer preferably being of same type as said polymer in fluidised bed powder form, preferably said coating being performed via crosshead extrusion relative to said single roving or said plurality of parallel rovings;
- said polymer in fluidised bed powder form is a thermoplastic polymer or mixture of thermoplastic polymers;
- said thermoplastic polymer or mixture of thermoplastic polymers further comprises carbon fillers, in particular carbon black or carbon nanofillers, preferably selected from among carbon nanofillers in particular graphenes and/or carbon nanotubes and/or carbon nanofibrils or mixtures thereof;
- the thermoplastic polymer or mixture of thermoplastic polymers further comprises liquid crystal polymers or cyclic polybutylene terephthalate, or mixtures containing the same, as additive;
- said thermoplastic polymer, or mixture of thermoplastic polymers, is selected from among amorphous polymers having a glass transition temperature such that $Tg \geq 80°$ C. and/or from among semi-crystalline polymers having a melting temperature $Tf \geq 150°$ C.,
- the thermoplastic polymer or mixture of thermoplastic polymers is selected from among: polyaryl ether ketones (PAEK), in particular polyether ether ketone (PEEK); polyaryl ether ketone ketones (PAEKK), in particular polyether ketone ketone (PEKK); aromatic polyether-imides (PEI); polyaryl sulfones, in particular polyphenylene sulfones (PPSU); polyarylsulfides, in particular polyphenylene sulfides (PPS); polyamides (PA), in particular aromatic polyamides optionally modified by urea units; polyacrylates in particular polymethyl methacrylate (PMMA); or fluorinated polymers, in particular polyvinylidene fluoride (PVDF); and the mixtures thereof;
- said fibrous material comprises continuous fibres selected from among carbon, glass, silicon carbide, basalt, silica fibres, natural fibres in particular flax or hemp, sisal, silk or cellulose fibres in particular viscose, or thermoplastic fibres having a glass transition temperature Tg higher than the Tg of said polymer or said mixture of polymers when the latter are amorphous, or has a melting temperature Tf higher than the Tf of said polymer or said mixture of polymers when the latter are semi-crystalline, or a mixture of two or more of said fibres, preferably a mixture of carbon, glass or silicon carbide fibres, in particular carbon fibres;
- the volume percentage of said polymer or mixture of polymers relative to said fibrous material varies from 40 to 250%, preferably from 45 to 125% and more preferably from 45 to 80%;
- the volume percentage of said polymer or said mixture of polymers relative to said fibrous material varies from 0.2 to 15%, preferably between 0.2 and 10% and more preferably between 0.2 and 5%;
- the calendering step ii) is performed using a plurality of heating calenders;
- said heating calender(s) at step ii) comprise an integrated heating system via induction or microwave, preferably via microwave, combined with the presence of carbon fillers in said thermoplastic polymer or mixture of thermoplastic polymers;
- said heating calender(s) at step ii) are coupled to an additional rapid heating device, positioned before and/or after said (each) calender, in particular a microwave or induction heating device combined with the presence of carbon fillers in said polymer or in said mixture of polymers, or an infrared IR or Laser heating device, or via direct contact with another heat source such as a flame.

The invention also relates to a unidirectional ribbon of pre-impregnated fibrous material, in particular a ribbon wound on a spool, characterized in that it is obtained by a method such as defined above.

According to one optional characteristic, the width and thickness of the ribbon are adapted for depositing by a robot for the manufacture of three-dimensional parts, without the need for slitting, and preferably this width is at least 5 mm possibly reaching 100 mm, more preferably it is between 5 and 50 mm and further preferably between 5 and 10 mm.

The invention also relates to utilisation of the method such as defined above for the production of calibrated ribbons adapted to the manufacture of three-dimensional composite parts via automated deposit of said ribbons by a robot.

The invention also relates to utilisation of the ribbon such as defined above for the manufacture of three-dimensional parts. Said manufacture of said composite parts concerns the transport sectors, in particular automobile, civil or military aviation, nautical, rail; renewable energies in particular wind, hydrokinetic; energy storage systems, solar panels; thermal protection panels; sports and leisure equipment, health and medicine; ballistics with parts for weapons or missiles; safety and electronics.

The invention also concerns a three-dimensional composite part, characterized in that it results from the use of at least one unidirectional ribbon in pre-impregnated fibrous material such as defined above.

Finally, the invention is directed towards a unit for implementing the production method such as defined above, said unit being characterized in that it comprises:
a) a device for continuous impregnation of a roving or plurality of parallel rovings of fibrous material, comprising a tank of a fluidised bed of powder polymer;

b) a device for continuous calendering of said roving or said parallel rovings, with forming into a single ribbon or into several parallel unidirectional ribbons, comprising:
  b1) at least one heating calender, in particular several heating calenders in series, said calender having a calendering groove or several calendering grooves and preferably in this latter case having up to 200 calendering grooves;
  b2) a system for regulating pressure and/or spacing between calender rollers.

Figure 2:
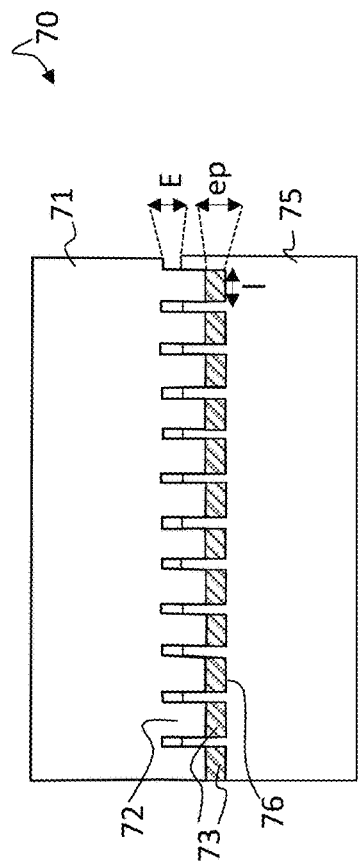
Figure 4:
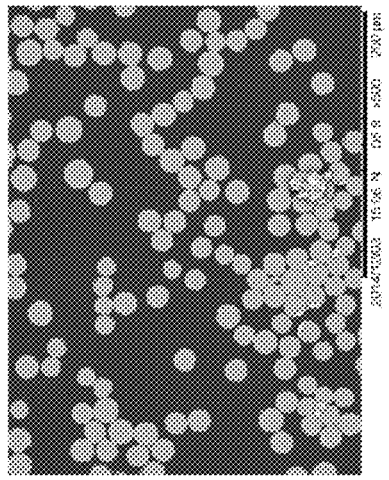
Figure 3:
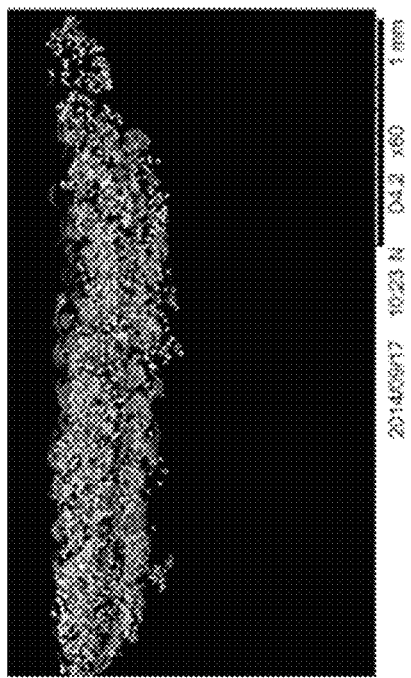
Figure 5:
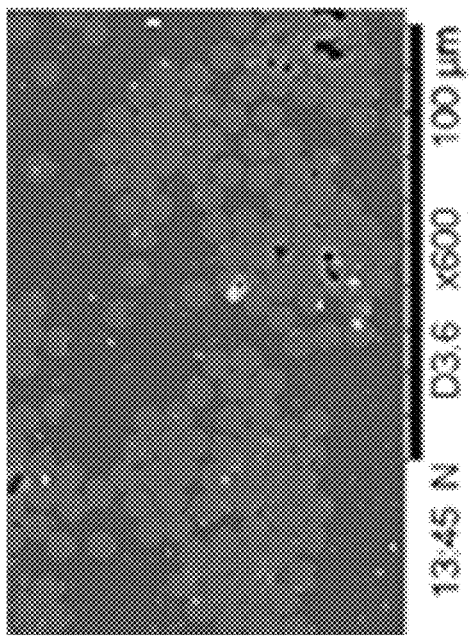

According to other optional characteristics of said unit:
it further comprises a device to spool the ribbons of pre-impregnated fibrous material, comprising an identical number of spools to the number of ribbons, one spool being allocated to each ribbon;
said impregnation device, following after said fluidised bed tank, additionally comprises a device for coating said roving(s) of fibrous material impregnated at step i), with a molten polymer, preferably said coating device comprising a crosshead extrusion device relative to said roving or relative to said parallel rovings;
said heating calender(s) comprise an integrated induction heating system;
said heating calender(s) are coupled to an additional rapid heating device positioned before and/or after said (each) calender, said rapid heating device being selected from among a microwave or induction device in particular when combined with the presence of carbon fillers, or an IR or Laser device or other device allowing direct contact with a heat source such as a flame device;

Other particular aspects and advantages of the invention will become apparent on reading the description that is non-limiting and given for illustrative purposes, with reference to the appended Figures illustrating:

FIG. 1, a schematic of a unit to implement the method of producing a pre-impregnated fibrous material according to the invention;

FIG. 2, a cross-sectional schematic of two constituent rollers of a calender such as used in the unit in FIG. 1, FIG. 3, a photo taken under scanning electron microscope of a cross-sectional view of a glass fibre roving of 1200 Tex, impregnated to the core with a PA11 polyamide powder of mean size 100 µm;

FIG. 4, a photo taken under scanning electron microscope of a cross-sectional view of a composite ribbon obtained by calendering the glass fibre roving in FIG. 3, FIG. 5, a photo taken under scanning electron microscope of a cross-sectional view of a composite ribbon obtained by calendering a roving of 12K carbon fibres, pre-impregnated with PA11 polyamide powder.

DETAILED DESCRIPTION OF THE INVENTION

Polymer Matrix

By thermoplastic or thermoplastic polymer is meant a material generally solid at ambient temperature, possibly being crystalline, semi-crystalline or amorphous, which softens on temperature increase, in particular after passing its glass transition temperature (Tg), flows at higher temperature and may melt without any phase change when it passes its melting temperature (Tf) (if it is semi-crystalline); it returns to the solid state when the temperature drops to below its melting temperature and below its glass transition temperature.

With regard to the constituent polymer of the fibrous material impregnation matrix, it is advantageously a thermoplastic polymer or mixture of thermoplastic polymers. This thermoplastic polymer or mixture of thermoplastic polymers is ground to a powder so that it can be used in a fluidised bed. The powder particles preferably have a mean diameter of less than 125 µm so that they can penetrate the fibre roving (s).

Optionally, the thermoplastic polymer or mixture of thermoplastic polymers further comprises carbon fillers, carbon black in particular or carbon nanofillers, preferably selected from among carbon nanofillers in particular graphenes and/or carbon nanotubes and/or carbon nanofibrils or the mixtures thereof. These fillers allow conducting of electricity and heat and therefore allow improved lubrication of the polymer matrix when it is heated.

According to another variant, the thermoplastic polymer or mixture of thermoplastic polymers may further comprise additives such a liquid crystal polymers or cyclic polybutylene terephthalate, or mixtures containing the same such as CBT100 resin marketed by CYCLICS CORPORATION. These additives particularly allow fluidisation of the polymer matrix in the molten state, for better penetration into the core of the fibres. Depending on the type of thermoplastic polymer or polymer mixture used to prepare the impregnation matrix, in particular the melting temperature thereof, one or other of these additives will be chosen.

Advantageously, the thermoplastic polymer, or mixture of thermoplastic polymers, is selected from among amorphous polymers having a glass transition temperature such that Tg≥80° C. and/or from among semi-crystalline polymers having a melting temperature Tf≥150° C.

More particularly, the thermoplastic polymers entering into the composition of the fibrous material impregnation matrix can be selected from among:
  polymers and copolymers of the polyamide family (PA), such as high density polyamide, polyamide 6 (PA-6), polyamide 11 (PA-11), polyamide 12 (PA-12), polyamide 6.6 (PA-6.6), polyamide 4.6 (PA-4.6), polyamide 6.10 (PA-6.10), polyamide 6.12 (PA-6.12), aromatic polyamides, optionally modified by urea units, in particular polyphthalamides and aramid, and block copolymers in particular polyamide/polyether,
  polyureas, aromatic in particular,
  polymers and copolymers of the acrylic family such as polyacrylates, and more particularly polymethyl methacrylate (PMMA) or the derivatives thereof,
  polymers and copolymers of the polyarylether ketone family (PAEK) such as polyether ether ketone (PEEK), or polyarylether ketone ketones (PAEKK) such as polyether ketone ketone) (PEKK) or the derivatives thereof,
  aromatic polyether-imides (PEI),
  polyarylsulfides, in particular polyphenylene sulfides (PPS),
  polyarylsulfones, in particular polyphenylene sulfones (PPSU),
  polyolefins, in particular polypropylene (PP);
  polylactic acid (PLA),
  polyvinyl alcohol (PVA),
  fluorinated polymers, in particular polyvinylidene fluoride (PVDF), or polytetrafluoroethylene (PTFE) or polychlorotrifluoroethylene (PCTFE),
  and the mixtures thereof.

Preferably the constituent polymers of the matrix are selected from among thermoplastic polymers having a high melting temperature Tf, namely on and after 150° C., such as Polyamides (PA), in particular aromatic polyamides optionally modified by urea repeat units and the copolymers thereof, Polymethyl methacrylate (PPMA) and the copolymers thereof, Polyether imides (PEI), Polyphenylene sulfide (PPS), Polyphenylene sulfone (PPSU), Polyetherketoneketone (PEKK), Polyetheretherketone (PEEK), fluorinated polymers such as polyvinylidene fluoride (PVDF).

For fluorinated polymers, a homopolymer of vinylidene fluoride (VDF of formula $CH_2=CF_2$) can be used, or a VDF copolymer comprising at least 50 weight % VDF and at least one other monomer copolymerisable with VDF. The VDF content must be higher than 80 weight %, even better higher than 90 weight % to impart good mechanical strength to the structural part, especially when subjected to thermal stresses. The comonomer may be a fluorinated monomer such as vinyl fluoride for example.

For structural parts that are to withstand high temperatures, in addition to fluorinated polymers advantageous use can be made according to the invention of PAEKs (PolyArylEtherKetone) such as polyether ketones (PEK), polyether ether ketone (PEEK), polyether ketone ketone (PEKK), polyether ketone ether ketone ketone (PEKEKK), etc.

Fibrous Material:

Regarding the constituent fibres of the fibrous material, these are fibres of mineral, organic or plant origin in particular. Among the fibres of mineral origin, mention can be made of carbon fibres, glass fibres, basalt fibres, silica fibres or silicon carbide fibres for example. Among the fibres of organic origin, mention can be made of fibres containing a thermoplastic or thermosetting polymer such as aromatic polyamide fibres, aramid fibres or polyolefin fibres for example. Preferably they are thermoplastic polymer-based and have a glass transition temperature Tg higher than the Tg of the constituent thermoplastic polymer or thermoplastic polymer mixture of the impregnation matrix if the polymer(s) are amorphous, or a melting temperature Tf higher than the Tf of the constituent thermoplastic polymer or thermoplastic polymer mixture of the impregnation matrix if the polymer(s) are semi-crystalline. There is therefore no risk of melting of the constituent organic fibres of the fibrous material. Among the fibres of plant origin, mention can be made of natural flax, hemp, silk in particularly spider silk, sisal fibres and other cellulose fibres particularly viscose. These fibres of plant origin can be used pure, treated or coated with a coating layer to facilitate adhesion and impregnation of the thermoplastic polymer matrix.

These constituent fibres can be used alone or in a mixture. For example, organic fibres can be mixed with mineral fibres for impregnation with thermoplastic polymer and to form the pre-impregnated fibrous material.

The chosen fibres can be single-strand, multi-strand or a mixture of both, and can have several gram weights. In addition they may have several geometries. They may therefore be in the form of short fibres, then producing felts or nonwovens in the form of strips, sheets, braids, rovings or pieces, or in the form of continuous fibres producing 2D fabrics, fibres or rovings of unidirectional fibres (UD) or nonwovens. The constituent fibres of the fibrous material may also be in the form of a mixture of these reinforcing fibres having different geometries. Preferably, the fibres are continuous.

Preferably, the fibrous material is composed of continuous fibres of carbon, glass or silicon carbide or a mixture thereof, in particular carbon fibres. It is used in the form of one or more rovings.

Depending on the volume ratio of polymer relative to the fibrous material, it is possible to produce so-called "ready-to-use" pre-impregnated materials or so-called "dry" pre-impregnated materials.

In so-called "ready-to-use" pre-impregnated materials, the thermoplastic polymer or polymer mixture is uniformly and homogeneously distributed around the fibres. In this type of material, the impregnating thermoplastic polymer must be distributed as homogenously as possible within the fibres to obtain minimum porosities i.e. voids between the fibres. The presence of porosities in this type of material may act as stress-concentrating points when subjected to a mechanical tensile stress for example and then form rupture initiation points in the pre-impregnated fibrous material causing mechanical weakening. Homogeneous distribution of the polymer or polymer mixture therefore improves the mechanical strength and homogeneity of the composite material produced from these pre-impregnated fibrous materials.

Therefore, with regard to so-called "ready-to-use" pre-impregnated materials, the volume percentage of thermoplastic polymer or polymer mixture relative to the fibrous material varies from 40 to 250%, preferably from 45 to 125%, and more preferably from 45 to 80%.

So-called "dry" pre-impregnated fibrous materials comprise porosities between the fibres and a smaller amount of impregnating thermoplastic polymer coating the fibres on the surface to hold them together. These "dry" pre-impregnated materials are adapted for the manufacture of preforms for composite materials. These preforms can then be used for the infusion of thermoplastic resin or thermosetting resin for example. In this case, the porosities facilitate subsequent conveying of the infused polymer into the pre-impregnated fibrous material, to improve the end properties of the composite material and in particular the mechanical cohesion thereof. In this case, the presence of the impregnating thermoplastic polymer on the so-called "dry" fibrous material is conducive to compatibility of the infusion resin.

With regard to so-called "dry" pre-impregnated materials therefore, the volume percentage of polymer or mixture of polymers relative to the fibrous material advantageously varies from 0.2 to 15%, preferably between 0.2 and 10% and more preferably between 0.2 and 5%. In this case the term polymeric web is used having low gram weight, deposited on the fibrous material to hold the fibres together.

The method of producing a fibrous material according to the invention advantageously comprises two steps: a first step to impregnate the fibrous material with the thermoplastic polymer, followed by a step to form the pre-impregnated fibrous material into one or more unidirectional ribbons having calibrated width and thickness.

Impregnation Step:

The production method and unit to implement this method are described below with reference to FIG. 1 which, in very simple manner, schematises the constituent elements of this unit 100.

Advantageously, the impregnation step of the fibrous material is performed by passing one or more rovings through a continuous impregnating device comprising a tank 20 of a polymer powder fluidised bed.

Each roving to be impregnated is unwound from a reel 11 device 10, under traction generated by cylinders (not illustrated). Preferably the device 10 comprise a plurality of reels 11, each reel allowing the unwinding of one roving to be impregnated. It is therefore possible to impregnate several fibre rovings simultaneously. Each reel 11 is provide with a braking system (not illustrated) to tension each fibre roving.

In this case an alignment module 12 allows the fibre rovings to be arranged parallel to one another. In this manner the fibre rovings cannot come into contact with each other, thereby particularly avoiding mechanical degradation of the fibres.

The fibre roving or parallel fibre rovings then pass through a tank 20 of a fluidised bed 22, such as described in patent EP0406067. The powder of polymer(s) is placed in suspension in a gas G (e.g. air) added to the tank and circulating inside the tank through a hopper 21. The roving(s) are set in circulation in this fluidised bed 22. The mean diameter of the polymer powder particles in the fluidised bed is preferably smaller than 125 µm, so that they can penetrate the fibre roving(s). This impregnation is performed to allow adhesion of the polymer powder to the fibres. The roving(s) pre-impregnated with the powder then leave the tank and are directed towards the heating calender device, possibly with preheating before calendering and with optional post-calender heating.

Optionally, this impregnation step can be completed by a step to coat the pre-impregnated roving or rovings, immediately after leaving the tank 20 in which they were impregnated with fluidised bed powder 22, and just before the forming step via calendering. In this case, the airlock at the outlet of the fluidised tank 20 (fluidised bed 22) can be connected to a coating device 30 which may comprise a coating crosshead as also described in patent EP0406067. More particularly, said coating device comprises a crosshead supplied with molten thermoplastic polymer by an extruder 30. The coating polymer may the same or different from the polymer powder in the fluidised bed. Preferably it is of same type. Said coating not only allows completion of the fibre impregnation step to obtain a final volume percentage of polymer within the desired range, in particular to obtain so-called "ready-to-use" fibrous materials of good quality, but also allows improvement in the performance of the composite material obtained.

Forming Step

Immediately on leaving the fluidisation tank 20, the pre-impregnated roving or parallel rovings, optionally coated with molten polymer, are formed into a single unidirectional ribbon or into a plurality of parallel unidirectional ribbons, by means of a continuous calendering device comprising one or more heating calenders.

Up until the present time, hot calendering could not be envisaged for a forming step but only for a finishing step since it was not able to heat up to sufficient temperatures, in particular if the thermoplastic polymer or polymer mixture comprises polymers with a high melting temperature.

Advantageously, the heating calenders of the calendering device are coupled to rapid heating means which allow the material to be heated not only on the surface but also at the core. The mechanical stress of the calenders coupled to these rapid heating means allows porosities to be removed and the polymer to be distributed homogeneously, in particular if the fibrous material is a so-called "ready-to-use" material.

Advantageously, this hot calendering not only allows the impregnation polymer to be heated so that it penetrates into, adheres to and uniformly coats the fibres, but also provides control over the thickness and width of the ribbons of pre impregnated fibrous material.

To produce a plurality of parallel unidirectional ribbons i.e. as many ribbons as pre-impregnated parallel rovings passed through the fluidised bed, the heating calenders referenced 51, 52, 53 in the schematic in FIG. 1 advantageously comprise a plurality of calendering grooves conforming to the number of ribbons. This number of grooves may total up to 200 for example. A SYST servo system allows regulation of the pressure and/or of the spacing E between the rollers 71, 75 of the calender 70, so as to control the thickness ep of the ribbons. Said calender 70 is schematised in FIG. 2 described below.

The calendering device comprises at least one heating calender 51. Preferably it comprises several heating calenders 51, 52, 53 mounted in series. The fact that there are several calenders in series means that it is possible to compress the porosities and reduce the number thereof. This plurality of calenders is therefore of importance if it is desired to produce so-called "ready-to-use" fibrous materials. On the other hand, to produce so-called "dry" fibrous materials, a fewer number of calenders will be sufficient, even a single calender.

Advantageously, each calender of the calendering device has an integrated heating system via induction or microwave, preferably microwave, to heat the thermoplastic polymer or polymer mixture. Advantageously if the polymer of polymer mixture comprises carbon fillers such as carbon black or carbon nanofillers, preferably selected from among carbon nanofillers in particular graphenes and/or carbon nanotubes and/or carbon nanofibrils or the mixtures thereof, the heating effect via induction or microwave is amplified by these fillers which then convey the heat into the core of the material.

Advantageously, each calender 51, 52, 53 of the device is coupled to a rapid heating device 41, 42, 43 positioned before and/or after each calender for rapid transmission of thermal energy to the material and for perfecting of fibre impregnation with the molten polymer. The rapid heating device can be selected for example from among the following devices: a microwave or induction device, an infrared IR or laser device or other device allowing direct contact with a heat source such as a flame device. A microwave or induction device is most advantageous, in particular when combined with the presence of carbon nanofillers in the polymer or polymer mixture since carbon nanofillers amplify the heating effect and transmit this effect to the core of the material.

According to one variant of embodiment it is also possible to combine several of these heating devices.

The method may further comprise a step to heat the fibre rovings before said impregnation using microwave heating as preferred heating means, as for the heating system of said heating calender.

Optionally, a subsequent step is to spool the pre-impregnated, formed ribbon(s). For this purpose a unit 100 to implement the method comprises a spooling device 60 comprising as many spools 61 as there are ribbons, one spool 61 being allocated to each ribbon. A distributor 62 is generally provided to direct the pre-impregnated ribbons towards their respective spool 61 whilst preventing the ribbons from touching one another to prevent any degradation.

FIG. 2 schematises cross-sectional details of the groove 73 of a calender 70. A calender 70 comprises an upper roller 71 and a lower roller 75. One of the rollers e.g. the upper roller 71 comprises a castellated part 72, whilst the other roller i.e. the lower roller 75 in the example comprises a grooved part 76, the shape of the grooves matching the protruding parts 72 of the upper roller. The spacing E between the rollers 71, 75 and/or the pressure applied by the two rollers against one another allows defining of the dimensions of the grooves 73, and in particular the thickness ep thereof and width I. Each groove 73 is designed to house a fibre roving which is then pressed and heated between the rollers. The rovings are subsequently transformed into parallel unidirectional ribbons, the thickness and width of which are calibrated by the grooves 73 of the calenders. Each calender advantageously comprises a plurality of grooves the number of which may total up to 200, so that as many ribbons can be produced as there are grooves and pre-impregnated rovings. The calendering device also comprises a central device referenced SYST in FIG. 1, driven by a computer programme provided for this purpose and which allows simultaneous regulation of the pressure and/or spacing between the calender rollers of all the calenders in the unit 100.

The unidirectional ribbon(s) thus produced have a width l and thickness ep adapted for depositing by a robot for the manufacture of three-dimensional parts without the need for slitting. The width of the ribbon(s) is advantageously between 5 and 100 mm, preferably between 5 and 50 mm, and more preferably between 5 and 10 mm.

The method of producing a pre-impregnated fibrous material just described therefore allows pre-impregnated fibrous materials to be produced with high productivity whilst allowing homogeneous impregnation of the fibres, providing control over porosity which is reproducible and hence providing controlled, reproducible performance of the targeted end composite product. Homogeneous impregnation around the fibres and the absence of porosities are ensured by the fluidised bed impregnation step coupled with the use of a forming device under mechanical loading itself coupled to rapid heating systems, thereby allowing heating of the material on the surface as well as at the core. The materials obtained are semi-finished products in the form of ribbons with calibrated thickness and width used for the manufacture of three-dimensional structural parts in transport sectors such as automobile, civil or military aviation, nautical, rail; renewable energies in particular wind energy, hydrokinetic energy; energy storage devices, solar panels; thermal protection panels; sports and leisure equipment, health and medicine, weaponry and ballistics (parts for weapons or missiles), safety—using a method entailing the deposition of strips assisted by a robot head for example and known as Automatic Fibre Placement (AFP).

This method therefore allows the continuous manufacture of ribbons of calibrated size and long length, with the result that it avoids slitting and stubbing steps that are costly and detrimental to the quality of subsequently manufactured composite parts. The savings related to elimination of the slitting step represent about 30-40% of the total production cost of a ribbon of pre-impregnated fibrous material.

The association of rapid heating devices with the heating calenders facilitates forming of the ribbons to the desired dimensions, and allows a significant increase in the production rate of these ribbons compared with conventional forming methods. In addition this association allows densification of the material by fully eliminating the porosities in so-called "ready-to-use" fibrous materials.

The rapid heating devices also allow the use of numerous grades of polymers, even the most viscous, thereby covering all the desired ranges of mechanical strength.

For the specific manufacture of ribbons of so-called "dry" fibrous materials, the fluidised bed impregnation step allows a polymer gram weight to be obtained that is homogenously distributed, controlled and reproducible with a preferred content of deposited polymer in the order of 5 to 7 g/m.

The method therefore allows the production of calibrated ribbons of pre-impregnated fibrous material adapted for the manufacture of three-dimensional composite parts via automated deposition of said ribbons.

The following examples give a non-limiting illustration of the scope of the invention.

EXAMPLES

Example 1

A glass fibre roving of 1200 Tex was immersed in a fluidised powder bed composed of PA11 polyamide powder having a mean particle size of 100 µm. The PA11 powder was previously dry mixed with 0.2% (by weight) of carbon black powder of 50 µm particle size.

On leaving the fluidised bed the glass fibre roving was heated up to the softening temperature of the polymer (150° C.) to fix the powder on the glass fibres. The impregnation method allowed impregnation to the core of the fibre rovings. The force applied to the roving was low and just sufficient to tension the fibre roving.

Before being placed in the calender, the powder pre-impregnated roving was heated by means of an infrared (IR) oven until melting of the polymer and then placed in the heating calender having a wall temperature (i.e. the temperature of the surface of the castellated portion and grooved portion) brought to 110° C. The fluidised bed through-rate and calender through-rate were the same since the roving is tensioned and both items of equipment are in series. The linear speed of the roving was 20 m/mn. The calender was essentially characterized by a groove of width 6.35 mm in which a castellated portion was inserted under pressure. The pressure was controlled by an adapted device and maintained constant at 5 bars throughout the calendering test.

Results:

The photo in FIG. 3, taken under scanning electron microscope SEM, gives a cross-sectional view of the pre-impregnated glass fibre roving before calendering. It can be seen that the polymer powder is truly present at the core of the fibre roving, which proves the efficacy of the fluidised bed impregnation mode. The powder particles are still visible even after the fixing phase via softening of the polymer.

Table 1 below gives the width measurements that were obtained with 30 samples representing the pre-impregnated roving before calendering. It can be observed that the roving width is quite variable with a minimum of 1.26 mm and maximum of 4.54 mm.

TABLE 1

Width measurements of samples representing the pre-impregnated roving before calendering.

| | Width (mm) |
|---|---|
| Mini | 1.26 |
| Maxi | 4.54 |
| Mean | 2.98 |
| Std. deviation | 0.77 |

Table 2 below gives the width measurements obtained on 30 samples representing the ribbon after calendering. It can be seen that the variation in roving width is much narrower than for the pre-impregnated roving before calendering, with a minimum of 5.01 mm and maximum of 6.85. It is also observed that the mean value of the calendered ribbon is much higher than that of the pre-impregnated roving before calendering (2.98 mm compared with 6.19) and is close to the target of 6.35 mm (size of the calender groove) which shows the efficacy of calendering to finish the production of the composite ribbon after the pre-impregnation phase of the glass fibre roving.

TABLE 2

Width measurements of samples representing the ribbon calendered from a glass fibre roving of 1200 Tex, pre-impregnated with PA11 powder.

|  | Width (mm) |
| --- | --- |
| Mini | 5.01 |
| Maxi | 6.85 |
| Mean | 6.19 |
| Std. deviation | 0.34 |

FIG. 4 is a cross-sectional view of the composite ribbon after calendering, observed under scanning electron microscope, after preparation of the surface by polishing following the rules of the art. It can be seen that the PA11 powder particles have disappeared giving way to a homogeneous polymer matrix of the composite having scarce porosity. This proves that calendering allows melting of the powder and consolidation of the composite ribbon as was desired.

This example demonstrates the efficacy of the impregnation method using a dry powder in a fluidised bed in association with calendering, to obtain a glass fibre unidirectional composite ribbon (UD) impregnated with a thermoplastic matrix and having a width of 6.35 mm (¼ inch), without having recourse to slitting of a unidirectional composite sheet.

Example 2

The operating conditions were identical to Example 1. The particle size of the PA11 powder differed (30 µm on average compared with 100 µm in Example 1). In this example carbon fibres were used forming a 12K roving. FIG. 5 gives a cross-sectional view of the composite ribbon obtained, after calendering, observed under scanning electron microscope (SEM). As in Example 1 the powder particles melted to give way to a polymer matrix of composite ribbon that is homogeneous and scarcely porous.

Width measurements of the calendered composite ribbon are given in Table 3, following the same measuring protocol as in Example 1.

TABLE 3

Width measurements of samples representing a ribbon calendered from the 12K carbon fibre roving pre-impregnated with PA11 powder.

|  | Width (mm) |
| --- | --- |
| Mini | 6.00 |
| Maxi | 6.75 |
| Mean | 6.36 |
| Std. deviation | 0.13 |

This demonstrates the efficacy of the impregnation method using a dry powder in a fluidised bed in association with calendering, to obtain a composite, unidirectional (UD) carbon fibre ribbon having a width of 6.35 mm (¼ inch), without having recourse to slitting a unidirectional composite sheet.

The invention claimed is:

1. A method of producing a pre-impregnated fibrous material comprising a fibrous material of continuous fibres and a thermoplastic polymer matrix, wherein said pre-impregnated fibrous material is produced in a plurality of parallel unidirectional ribbons, wherein the method comprises the following steps:
    i) impregnating said fibrous material, in the form of several parallel rovings, said rovings not being in contact with each other, with said thermoplastic polymer or a mixture of thermoplastic polymers, in the form of a fluidised bed powder, the powder having powder particles with a mean diameter of less than 125 µm, and
    ii) forming said parallel rovings of said fibrous material impregnated at step i), via calendering by means of at least one heating calender, into the form of a plurality of parallel unidirectional ribbons, said heating calender comprises a plurality of calendering grooves conforming to the number of said ribbons, the pressure and/or spacing between the rollers of said calender being regulated by a servo system.

2. The method according to claim 1, wherein the method further comprises a step iii) of spooling said ribbons on a plurality of spools, the number of spools being identical to the number of ribbons, one spool being allocated to each ribbon.

3. The method according to claim 1, wherein said impregnating said fibrous material in step i) is completed by a coating step of said single roving or said plurality of parallel rovings after impregnation with the powder at step i), with a molten thermoplastic polymer, wherein the polymer is the same or different from said polymer in fluidised bed powder form, said coating step being performed before said calendering in step ii).

4. The method according to claim 1, wherein said polymer in fluidised bed powder form is a thermoplastic polymer or mixture of thermoplastic polymers.

5. The method according to claim 4, wherein said thermoplastic polymer or mixture of thermoplastic polymers further comprises carbon fillers.

6. The method according to claim 4, wherein the thermoplastic polymer or mixture of thermoplastic polymers comprises liquid crystal polymers or cyclic polybutylene terephthalate, or mixtures containing the liquid crystal polymers or cyclic polybutylene terephthalate, as additive.

7. The method according to claim 1, wherein said thermoplastic polymer, or mixture of thermoplastic polymers, is selected from among amorphous polymers having a glass transition temperature Tg≥80° C. and/or from among semi-crystalline polymers having a melting temperature Tf≥150° C.

8. The method according to claim 7, wherein the thermoplastic polymer or mixture of thermoplastic polymers is selected from among: polyaryl ether ketones; polyaryl ether ketone ketones; aromatic polyether-imides; polyaryl sulfones; polyarylsulfides; polyamides; polyacrylates; or fluorinated polymers; or mixtures thereof.

9. The method according to claim 1, wherein said fibrous material comprises continuous fibres selected from among carbon, glass, silicon carbide, basalt, silica fibres, natural fibres, or thermoplastic fibres having a glass transition temperature Tg higher than the Tg of said polymer or a mixture of polymers when the latter are amorphous, or having a melting temperature Tf higher than the Tf of said polymer or said mixture of polymers when the latter are semi-crystalline, or a mixture of two or more of said fibres.

10. The method according to claim 1, wherein the volume percentage of said polymer or mixture of polymers relative to said fibrous material varies from 40 to 250%.

11. The method according to claim 1, wherein the volume percentage of said polymer or a mixture of polymers relative to said fibrous material varies from 0.2 to 15%.

12. The method according to claim 1, wherein the calendering in step ii) is performed using a plurality of heating calenders.

13. The method according to claim 1, wherein said heating calender(s) in step ii) comprise an integrated heating system via induction or microwave, combined with the presence of carbon fillers in said thermoplastic polymer or mixture of thermoplastic polymers.

14. The method according claim 1, wherein said heating calender(s) in step ii) are coupled to an additional rapid heating device positioned before and/or after said calender(s).

15. A unidirectional ribbon of pre-impregnated fibrous material, wherein the ribbon is obtained using the method according to claim 1.

16. The ribbon according to claim 15, wherein the ribbon has a width (I) and thickness adapted for depositing by a robot for the manufacture of three-dimensional parts, without the need for slitting.

17. The use of the method according to claim 1, for the production of calibrated ribbons adapted to the manufacture of three-dimensional composite parts via automated deposit of said ribbons by a robot.

18. The use of the ribbon of pre-impregnated fibrous material defined in claim 15 for the manufacture of three-dimensional composite parts.

19. The use according to claim 18, wherein said manufacture of said composite parts concerns the transport sectors; renewable energies; energy storage systems; thermal protection panels; sports and leisure equipment, health and medicine; ballistics with parts for weapons or missiles; safety and electronics.

20. A three-dimensional composite part, wherein the part results from the use of at least one unidirectional ribbon of pre-impregnated fibrous material according to claim 15.

21. A unit for implementing the method according to claim 1, wherein the unit comprises:
   a) a device for continuous impregnation of a roving or plurality of parallel rovings of fibrous material, comprising a tank of a fluidised bed of powder polymer; and
   b) a device for continuous calendering of said roving or said parallel rovings, with forming into a single ribbon or into several parallel unidirectional ribbons, comprising:
      b1) at least one heating calender, said calender having a calendering groove or several calendering grooves, and
      b2) a system for regulating pressure and/or spacing between calender rollers.

22. The unit according to claim 21, wherein the unit further comprises a device for spooling the ribbons of pre-impregnated fibrous materials, wherein said device for spooling comprises a number of spools identical to the number of ribbons, one spool being allocated to each ribbon.

23. The unit according to claim 21, wherein said device for continuous impregnation, following after said fluidised bed tank, further comprises a device for coating said roving(s) of fibrous material impregnated at step i), with a molten polymer.

24. The unit according to claim 21, wherein said heating calender(s) comprise an integrated heating system via induction.

25. The unit according to claim 21, wherein said heating calender(s) are coupled to an additional rapid heating device, positioned before and/or after said calender(s), said rapid heating device being selected from among a microwave or induction device.

* * * * *